United States Patent
Yao et al.

(10) Patent No.: US 9,411,343 B2
(45) Date of Patent: Aug. 9, 2016

(54) TEMPERATURE FEEDBACK CONTROL SYSTEM FOR DYNAMIC VOLTAGE FREQUENCY SCALING

(71) Applicant: Huawei Technologies Co., Ltd., Shenzhen, Guangdong (CN)

(72) Inventors: Zhen Yao, Shenzhen (CN); Liqian Chen, Shanghai (CN); Lili Pan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 664 days.

(21) Appl. No.: 13/871,543

(22) Filed: Apr. 26, 2013

(65) Prior Publication Data

US 2013/0297094 A1    Nov. 7, 2013

(30) Foreign Application Priority Data

Apr. 28, 2012    (CN) .......................... 2012 1 0132379

(51) Int. Cl.
*G05D 23/19* (2006.01)
*G06F 1/20* (2006.01)
*G06F 1/32* (2006.01)

(52) U.S. Cl.
CPC ................ *G05D 23/19* (2013.01); *G06F 1/206* (2013.01); *G06F 1/324* (2013.01); *G06F 1/3296* (2013.01); *Y02B 60/1217* (2013.01); *Y02B 60/1275* (2013.01); *Y02B 60/1285* (2013.01)

(58) Field of Classification Search
None
See application file for complete search history.

(56) References Cited

U.S. PATENT DOCUMENTS

| 6,445,908 | B1 | 9/2002 | Glazko et al. | |
|---|---|---|---|---|
| 2002/0158700 | A1 | 10/2002 | Nemoto | |
| 2005/0071705 | A1* | 3/2005 | Bruno | G06F 1/206 713/500 |
| 2009/0037712 | A1* | 2/2009 | Mallik | G06F 1/3203 713/1 |
| 2009/0204831 | A1 | 8/2009 | Cousson et al. | |
| 2012/0271481 | A1* | 10/2012 | Anderson | G06F 1/206 700/299 |
| 2013/0173946 | A1* | 7/2013 | Rotem | G06F 1/3206 713/340 |

FOREIGN PATENT DOCUMENTS

| CN | 1364335 A | 8/2002 |
|---|---|---|
| CN | 1379942 A | 11/2002 |
| CN | 101281415 A | 10/2008 |

* cited by examiner

*Primary Examiner* — Mohammad Ali
*Assistant Examiner* — Bernard G Lindsay
(74) *Attorney, Agent, or Firm* — Leydig, Voit & Mayer, Ltd.

(57) ABSTRACT

The present invention applies to the field of integrated-circuit control, and provides a temperature feedback control system and method for DVFS (Dynamic Voltage Frequency Scaling). In the present invention, a main processor sends a control data packet to a microprocessor according to a received temperature feedback trigger signal, and the microprocessor immediately triggers working of a temperature data acquiring module, and after the temperature data acquiring module acquires real-time temperature data of a chip, executes a temperature feedback algorithm on the real-time temperature data according to the control data packet to output a corresponding performance control parameter, so as to enable a DVFS circuit to adjust a working frequency and a working voltage of the chip, and further enable the chip to implement automatic frequency and voltage adjusting at a low voltage and a low temperature and at a high voltage and a high temperature.

6 Claims, 2 Drawing Sheets

TEMPERATURE FEEDBACK CONTROL SYSTEM FOR DYNAMIC VOLTAGE FREQUENCY SCALING

CROSS-REFERENCE TO RELATED APPLICATION

This application claims priority to Chinese Patent Application No. 201210132379.2, filed on Apr. 28, 2012, which is hereby incorporated by reference in its entirety.

TECHNICAL FIELD

The present invention relates to the field of integrated-circuit control, and in particular to a temperature feedback control system and method for DVFS.

BACKGROUND

At present, a chip of a handheld device has strict requirements on lifetime and power consumption of a power-supply battery. Therefore, a working frequency and a working voltage of the chip need to be dynamically adjusted through dynamic voltage frequency scaling (Dynamic Voltage Frequency Scaling, DVFS) according to a real-time load requirement of the chip, thereby achieving an objective of effectively reducing power consumption of the chip. However, in a DVFS application process, performance of the chip changes as a temperature of the chip itself changes at work. When a load of the chip is relatively light, the chip is enabled to be in a low voltage working mode through the DVFS. In this case, a running speed of the chip is directly proportional to a temperature of the chip, that is, the lower the temperature is, the lower the running speed is. When a load of the chip is relatively heavy, the chip is enabled to be in a high voltage working mode through the DVFS. In this case, a running speed of the chip is inversely proportional to a temperature of the chip, that is, the higher the temperature is, the lower the running speed is. It can be known from the foregoing cases that how to make a chip work normally at a low voltage and a low temperature and at a high voltage and a high temperature becomes a problem that needs to be solved urgently in a DVFS application.

For the foregoing problem existing in the DVFS application, two solutions are provided in the prior art: One is to reduce a working frequency of the chip in low voltage and high voltage working modes, that is, overcome, in a frequency reduction manner, a problem brought by a temperature change; however, this manner degrades overall performance of the chip at the same time; the other is to increase a working voltage of the chip in a low voltage working mode on a precondition that a working frequency of the chip remains unchanged, that is, ensure normal working of the chip at the cost of increasing power consumption; however, this solution obviously contradicts the foregoing application objective (which is reducing power consumption of the chip) of the DVFS.

In conclusion, the prior art cannot overcome a problem caused by a temperature change of a chip on a DVFS application on a precondition that overall performance of the chip is ensured and effective power consumption control is implemented on the chip.

SUMMARY

An objective of the present invention is to provide a temperature feedback control system for DVFS, in order to overcome a problem caused by a temperature change of a chip on a DVFS application on a precondition that overall performance of the chip is ensured and effective power consumption control is implemented on the chip.

The present invention is implemented as follows: A temperature feedback control system for DVFS is built in a chip and includes a DVFS circuit configured to adjust a working frequency and a working voltage of the chip, and the temperature feedback control system further includes:

a temperature data acquiring module, a microprocessor, and a main processor, where the temperature data acquiring module is configured to acquire real-time temperature data of the chip;

the microprocessor connects to the DVFS circuit and the temperature data acquiring module separately and is configured to trigger, according to a control data packet sent by the main processor, working of the temperature data acquiring module, read the real-time temperature data from the temperature data acquiring module, and execute a temperature feedback algorithm on the real-time temperature data according to the control data packet to output a corresponding performance control parameter to the DVFS circuit; and the main processor connects to the microprocessor and is configured to generate and send the control data packet according to a temperature feedback trigger signal sent by a user, and send a process termination instruction when the microprocessor needs to terminate a work process.

Another objective of the present invention is to provide a temperature feedback control method that is based on the temperature feedback control system for DVFS, where the temperature feedback control method includes the following steps:

A. a main processor generates and sends a control data packet according to a temperature feedback trigger signal sent by a user;

B. a microprocessor triggers, according to the control data packet, acquiring of real-time temperature data of a chip by a temperature data acquiring module;

C. the microprocessor reads the real-time temperature data of the chip from the temperature data acquiring module, and executes a temperature feedback algorithm on the real-time temperature data according to the control data packet to output a corresponding performance control parameter to a DVFS circuit;

D. the DVFS circuit adjusts a working frequency and a working voltage of the chip according to the performance control parameter; and F. continue to perform step C when the microprocessor does not receive a process termination instruction sent by the main processor.

In the present invention, a main processor sends a control data packet to a microprocessor according to a received temperature feedback trigger signal, and the microprocessor immediately triggers working of a temperature data acquiring module, and after the temperature data acquiring module acquires real-time temperature data of a chip, executes a temperature feedback algorithm on the real-time temperature data according to the control data packet to output a corresponding performance control parameter, so as to enable a DVFS circuit to adjust a working frequency and a working voltage of the chip, and further enable the chip to implement automatic frequency and voltage adjusting at a low voltage and a low temperature and at a high voltage and a high temperature, thereby overcoming a problem caused by a temperature change of a chip on a DVFS application on a precondition that overall performance of the chip is ensured and effective power consumption control is implemented on the chip.

DESCRIPTION OF EMBODIMENTS

To make the objectives, technical solutions, and advantages of the present invention more comprehensible, the following further describes the present invention in detail with reference to the accompanying drawings and embodiments. It should be understandable that the specific embodiments to be described are merely used to explain the present invention and are not intended to limit the present invention.

In the embodiments of the present invention, a main processor sends a control data packet to a microprocessor according to a received temperature feedback trigger signal, and the microprocessor immediately triggers working of a temperature data acquiring module, and after the temperature data acquiring module acquires real-time temperature data of a chip, executes a temperature feedback algorithm on the real-time temperature data according to the control data packet to output a corresponding performance control parameter, so as to enable a DVFS circuit to adjust a working frequency and a working voltage of the chip, and further enable the chip to implement automatic frequency and voltage adjusting at a low voltage and a low temperature and at a high voltage and a high temperature.

The following describes specific implementation of the present invention in detail with reference to specific embodiments:

Embodiment 1

Figure 1:
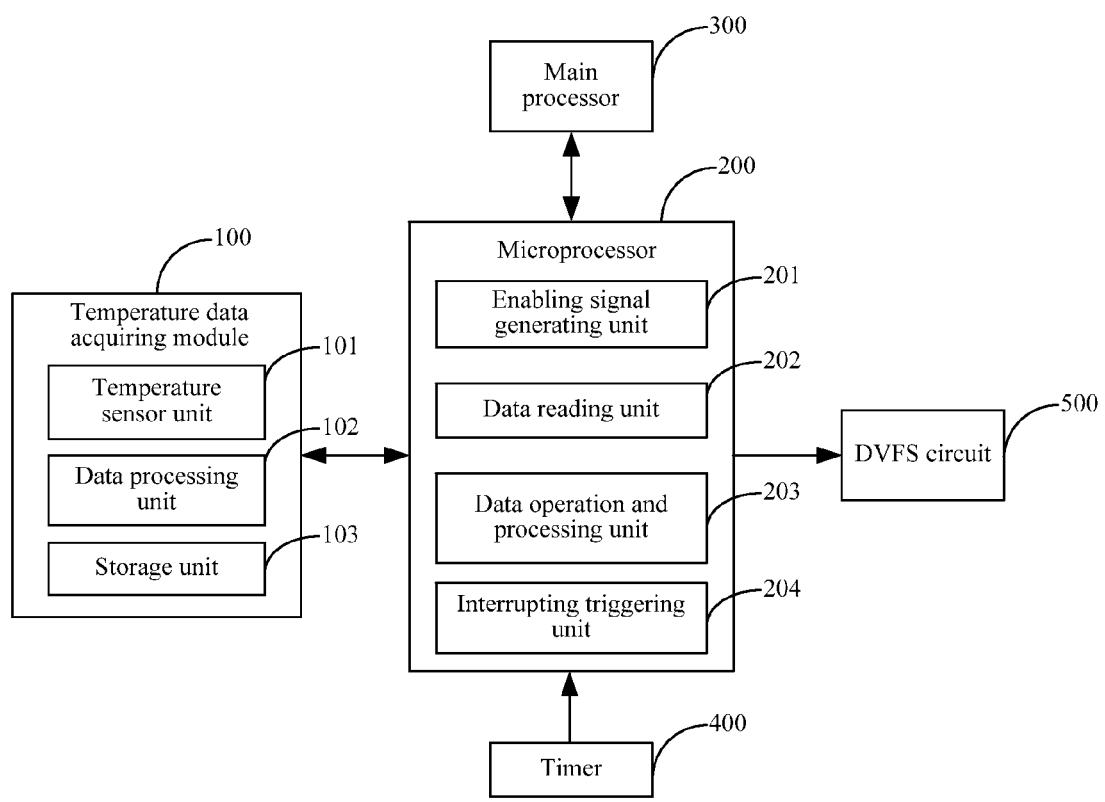
FIG. 1 is a modular structural diagram of a temperature feedback control system for DVFS according to Embodiment 1 of the present invention.

FIG. 1 shows a structure of a temperature feedback control system for DVFS according to Embodiment 1 of the present invention. For ease of description, only a part related to Embodiment 1 of the present invention is shown and described in detail as follows:

The temperature feedback control system is built in a chip and includes a DVFS circuit 500 configured to adjust a working frequency and a working voltage of the chip, and the temperature feedback control system further includes:

a temperature data acquiring module 100, a microprocessor 200, and a main processor 300;

the temperature data acquiring module 100 is configured to acquire real-time temperature data of the chip;

the microprocessor 200 connects to the DVFS circuit 500 and the temperature data acquiring module 100 separately and is configured to trigger, according to a control data packet sent by the main processor 300, working of the temperature data acquiring module 100, read the real-time temperature data from the temperature data acquiring module 100, and execute a temperature feedback algorithm on the real-time temperature data according to the control data packet to output a corresponding performance control parameter to the DVFS circuit 500; and the main processor 300 connects to the microprocessor 200 and is configured to generate and send the control data packet according to a temperature feedback trigger signal sent by a user, and send a process termination instruction when the microprocessor 200 needs to terminate a work process.

The temperature feedback control system further includes: a timer 400, which connects to the microprocessor 200 and is configured to output an interrupting signal at a preset interval to trigger entering of an interrupting processing routine by the microprocessor 200.

In this embodiment of the present invention, the microprocessor 200 may be an 8051 single-chip microcomputer or an ARM Cortex-M3 processor; and the main processor 300 may be an ARM Cortex-A9 processor, an ARM Cortex-A12 processor, or an ARM Cortex-A15 processor.

In this embodiment of the present invention, the temperature feedback trigger signal may be a high-level signal or a low-level signal that can be identified by the main processor 300; the control data packet includes a temperature acquiring start instruction, a low-temperature threshold T0, a first high-temperature threshold T1, a second high-temperature threshold T2, and a threshold adjustment step value d, where the low-temperature threshold T0, the first high-temperature threshold T1, the second high-temperature threshold T2, and the threshold adjustment step value d may be a Celsius temperature value (in the unit of ° C.), a Fahrenheit temperature value (in the unit of ° F.), or a Kelvin temperature value (in the unit of ° K); the performance control parameter includes reference data for adjusting the working voltage and the working frequency of the chip, and the DVFS circuit 500 outputs a corresponding frequency and voltage adjusting signal according to the reference data to adjust the working voltage and the working frequency of the chip; and the real-time temperature data and the low-temperature threshold T0, the first high-temperature threshold T1, the second high-temperature threshold T2, and the threshold adjustment step value d adopt a same temperature measurement unit.

As an embodiment of the present invention, the temperature data acquiring module 200 includes:

a temperature sensor unit 101, configured to detect a temperature of the chip and generate a corresponding temperature analog signal, where the temperature sensor unit 101 may be a temperature sensor;

a data processing unit 102, configured to trigger, according to an enabling signal sent by the microprocessor 200, working of the temperature sensor unit 101, to convert the temperature analog signal to a temperature digital signal; and a storage unit 103, configured to store the temperature digital signal as real-time temperature data.

As an embodiment of the present invention, the microprocessor 200 includes:

an enabling signal generating unit 201, configured to generate the enabling signal according to the temperature acquiring start instruction in the control data packet;

a data reading unit 202, configured to read the real-time temperature data from the temperature data acquiring module 200;

a data operation and processing unit 203, configured to execute the temperature feedback algorithm to generate and output the corresponding performance control parameter; and an interrupting triggering unit 204, configured to trigger, according to the interrupting signal sent by the timer 400, working of the data reading unit 202 and the data operation and processing unit 203.

The following describes in detail a working process in which the data operation and processing unit executes the temperature feedback algorithm:

The main processor 300 starts according to a temperature feedback trigger signal sent by a user, and generates and sends a control data packet; then the enabling signal generating unit 201 generates an enabling signal according to a temperature acquiring start instruction in the control data packet; the data processing unit 102 triggers, according to the enabling signal, detecting of a real-time temperature of the chip and generating of a corresponding temperature analog signal by the temperature sensor unit 101; and then the data processing unit 102 converts the temperature analog signal to a temperature digital signal, and stores the temperature digital signal in the storage unit 103 as real-time temperature data.

When the timer 400 sends the interrupting signal, the microprocessor 200 enters the interrupting processing routine. The interrupting triggering unit 204 triggers working of the data reading unit 202 and the data operation and processing unit 203. Subsequently, the data reading unit 202 reads the real-time temperature data of the chip from the storage unit 102. The data operation and processing unit 203 executes the temperature feedback algorithm on the real-time temperature data according to the control data packet to output the corresponding performance control parameter to the DVFS circuit 500. The DVFS circuit 500 adjusts the working frequency and the working voltage of the chip according to the performance control parameter. Finally, the microprocessor 200 determines whether the process termination instruction sent by the main processor 300 is received. If yes, the microprocessor 200 terminates the process; if no, the microprocessor 200 waits for the timer 400 to send the interrupting signal, and after the interrupting signal is received, the data operation and processing unit 203 executes the temperature feedback algorithm.

The temperature feedback algorithm executed by the data operation and processing unit 203 is specifically as follows:

When the real-time temperature data is equal to the low-temperature threshold T0, a corresponding performance control parameter is generated and output to the DVFS circuit, and a dynamic threshold T3 is set to a sum of the low-temperature threshold T0 and the threshold adjustment step value d. In addition, when the real-time temperature data is not equal to the low-temperature threshold T0, no corresponding performance control parameter is output.

When the real-time temperature data is equal to the dynamic threshold T3, a corresponding performance control parameter is generated and output to the DVFS circuit, and the first high-temperature threshold T1 is assigned to the dynamic threshold T3 (that is, T3=T1). In addition, when the real-time temperature data is not equal to the dynamic threshold T3, no corresponding performance control parameter is output.

When the real-time temperature data is equal to the dynamic threshold T3, a corresponding performance control parameter is generated and output to the DVFS circuit, and it is determined whether the dynamic threshold T3 is equal to the second high-temperature threshold T2. If yes, the second high-temperature threshold T2 is assigned to the dynamic threshold T3; if no, a sum of the dynamic threshold T3 and the threshold adjustment step value d is assigned to the dynamic threshold T3. In addition, when the real-time temperature data is not equal to the dynamic threshold T3, no corresponding performance control parameter is output.

Embodiment 2

Figure 2:
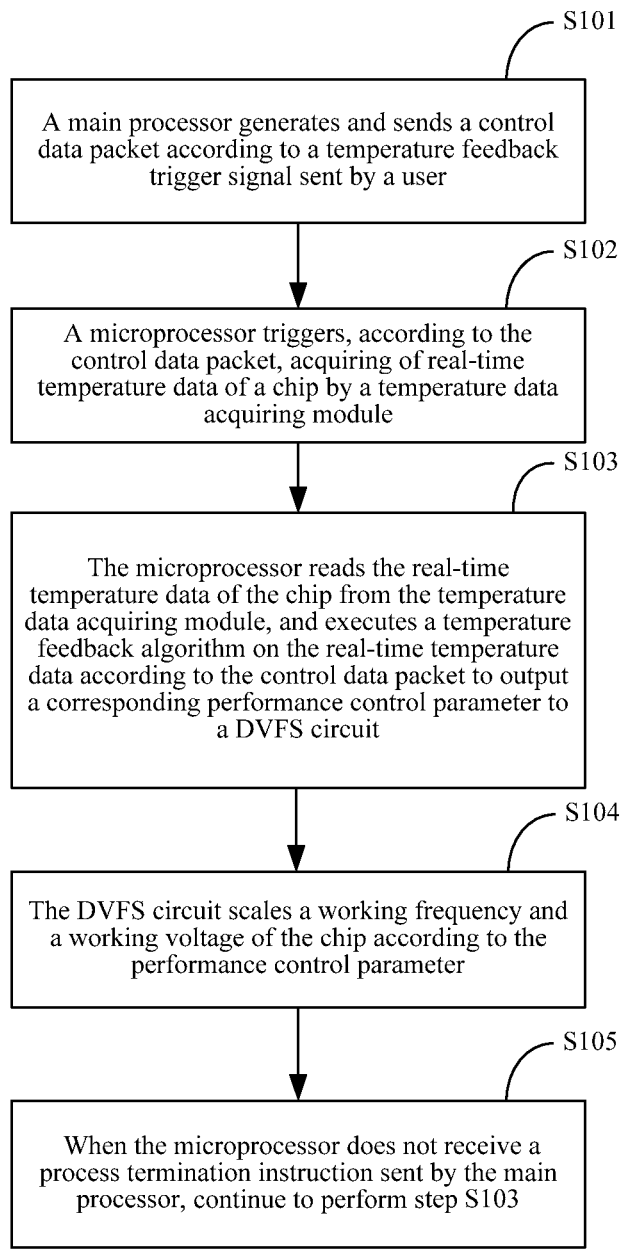
FIG. 2 is an implementation flowchart of a temperature feedback control method for DVFS according to Embodiment 2 of the present invention.

FIG. 2 shows an implementation flow of a temperature feedback control method for DVFS according to Embodiment 2 of the present invention. For ease of description, only a part related to Embodiment 2 of the present invention is shown and described in detail as follows:

In step S101, a main processor generates and sends a control data packet according to a temperature feedback trigger signal sent by a user.

The temperature feedback trigger signal may be a high-level signal or a low-level signal that can be identified by the main processor; the control data packet includes a temperature acquiring start instruction, a low-temperature threshold T0, a first high-temperature threshold T1, a second high-temperature threshold T2, and a threshold adjustment step value d, where the low-temperature threshold T0, the first high-temperature threshold T1, the second high-temperature threshold T2, and the threshold adjustment step value d may be a Celsius temperature value (in the unit of ° C.), a Fahrenheit temperature value (in the unit of ° F.), or a Kelvin temperature value (in the unit of ° K).

In step S102, a microprocessor triggers, according to the control data packet, acquiring of real-time temperature data of a chip by a temperature data acquiring module. Step S102 is specifically as follows:

An enabling signal generating unit in the microprocessor generates an enabling signal according to the temperature acquiring start instruction in the control data packet;

a data processing unit in the temperature data acquiring module triggers, according to the enabling signal, working of a temperature sensor unit;

the temperature sensor unit detects a real-time temperature of the chip and generates a corresponding temperature analog signal; and the data processing unit converts the temperature analog signal to a temperature digital signal, and stores the temperature digital signal as real-time temperature data in a storage unit.

The real-time temperature data and the low-temperature threshold, the first high-temperature threshold, the second high-temperature threshold, and the threshold adjustment step value adopt a same temperature measurement unit.

In step S103, the microprocessor reads the real-time temperature data of the chip from the temperature data acquiring module, and executes a temperature feedback algorithm on the real-time temperature data according to the control data packet to output a corresponding performance control parameter to a DVFS circuit.

The step of executing the temperature feedback algorithm on the real-time temperature data according to the control data packet to output the corresponding performance control parameter to the DVFS circuit specifically includes step a, step b, and step c.

In step a, when determining that the real-time temperature data is equal to the low-temperature threshold T0, a data operation and processing unit in the microprocessor generates and outputs a corresponding performance control parameter to the DVFS circuit, and sets a dynamic threshold T3 to a sum of the low-temperature threshold T0 and the threshold adjustment step value d. In addition, when the real-time temperature data is not equal to the low-temperature threshold T0, no corresponding performance control parameter is output.

Based on the foregoing step a, in step b, when determining that the real-time temperature data is equal to the dynamic threshold T3, the data operation and processing unit in the microprocessor generates and outputs a corresponding performance control parameter to the DVFS circuit, and assigns the first high-temperature threshold T1 to the dynamic threshold T3 (that is, T3=T1). In addition, when the real-time temperature data is not equal to the dynamic threshold T3, no corresponding performance control parameter is output.

Based on the foregoing step b, in step c, when determining that the real-time temperature data is equal to the dynamic threshold T3, the data operation and processing unit in the microprocessor generates and outputs a corresponding performance control parameter to the DVFS circuit, determines whether the dynamic threshold T3 is equal to the second high-temperature threshold T2, if yes, assigns the second high-temperature threshold T2 to the dynamic threshold T3, and if no, assigns a sum of the dynamic threshold T3 and the threshold adjustment step value d to the dynamic threshold T3. In addition, when the real-time temperature data is not equal to the dynamic threshold T3, no corresponding performance control parameter is output.

In step S104, the DVFS circuit adjusts a working frequency and a working voltage of the chip according to the performance control parameter.

The performance control parameter includes reference data for adjusting the working voltage and the working frequency of the chip, and the DVFS circuit outputs a corresponding frequency and voltage adjusting signal according to the reference data to adjust the working voltage and the working frequency of the chip.

In step S105, when the microprocessor does not receive a process termination instruction sent by the main processor, continue to perform step S103. When the microprocessor receives a process termination instruction sent by the main processor, terminate a work process.

In this embodiment of the present invention, step S103 is a step in which after receiving an interrupting signal, an interrupting triggering unit in the microprocessor triggers working of a data reading unit and the data operation and processing unit, where the data reading unit reads the real-time temperature data of the chip from the temperature data acquiring module, and the data operation and processing unit executes the temperature feedback algorithm on the real-time temperature data according to the control data packet.

Step S103 is further described below with reference to a specific example.

It is assumed that the low-temperature threshold T0 is 20° C., the first high-temperature threshold T1 is 50° C., the second high-temperature threshold T2 is 70° C., and the threshold adjustment step value is 2° C. The microprocessor enters an interrupting processing routine and reads the real-time temperature data of the chip after receiving the control data packet and when the interrupting signal arrives. When determining that the real-time temperature data is equal to T0 (that is, 20° C.), the data operation and processing unit in the microprocessor generates and outputs a performance control parameter, and sets that the dynamic threshold T3 is equal to T0+d (that is, 20° C.+2° C.=22° C.). Therefore, the DVFS circuit adjusts the working voltage and the working frequency of the chip by using the performance control parameter at a low temperature, thereby further increasing a temperature of the chip and a running speed of the chip. When the microprocessor enters a next terminal processing routine and the real-time temperature data rises to T3 (that is, 22° C.), the data operation and processing unit in the microprocessor generates and outputs a performance control parameter, and assigns T1 to T3 (that is, T3=T1=50° C.), and then the DVFS circuit adjusts the working voltage and the working frequency of the chip according to the performance control parameter, thereby lowering the temperature of the chip.

If the microprocessor enters a subsequent interrupting processing routine, and the read real-time temperature data continues to rise to 50° C. (that is, T3=T1), the microprocessor generates and outputs a performance control parameter and determines whether T3 is equal to T2; if yes, assigns T2 to T3, and if no, assigns T3 (that is, 50° C.)+d to T3. When the data operation and processing unit in the microprocessor determines that the real-time temperature data is equal to T2, the working voltage and the working frequency of the chip are adjusted according to a performance control parameter as well, thereby further achieving an objective of lowering the temperature of the chip. After that, when the real-time temperature data falls to a value between T1 and T2, the working process repeats to read and adjust the temperature of the chip in real time.

In the embodiments of the present invention, a main processor sends a control data packet to a microprocessor according to a received temperature feedback trigger signal, and the microprocessor immediately triggers working of a temperature data acquiring module, and after the temperature data acquiring module acquires real-time temperature data of a chip, executes a temperature feedback algorithm on the real-time temperature data according to the control data packet to output a corresponding performance control parameter, so as to enable a DVFS circuit to adjust a working frequency and a working voltage of the chip, and further enable the chip to implement automatic frequency and voltage adjusting at a low voltage and a low temperature and at a high voltage and a high temperature, thereby overcoming a problem caused by a temperature change of a chip on a DVFS application on a precondition that overall performance of the chip is ensured and effective power consumption control is implemented on the chip.

The foregoing description is merely exemplary embodiments of the present invention, but is not intended to limit the present invention. Any modification, equivalent replacement, and improvement made within the spirit and principle of the present invention shall fall within the protection scope of the present invention.

What is claimed is:

1. A temperature feedback control system for DVFS (Dynamic Voltage Frequency Scaling), built in a chip, and comprising:
   a DVFS circuit configured to adjust a working frequency and a working voltage of the chip,
   a temperature data acquiring module configured to acquire real-time temperature data of the chip,
   a microprocessor, and
   a main processor, wherein:
   the microprocessor connects to the DVFS circuit and the temperature data acquiring module separately and is configured to trigger, according to a control data packet sent by the main processor, working of the temperature data acquiring module, read the real-time temperature data from the temperature data acquiring module, and execute a temperature feedback algorithm on the real-time temperature data according to the control data packet to output a corresponding performance control parameter to the DVFS circuit;
   the main processor connects to the microprocessor and is configured to generate and send the control data packet according to a temperature feedback trigger signal sent by a user, and send a process termination instruction when the microprocessor needs to terminate a work process; and
   executing the temperature feedback algorithm comprises:
      in response to determining that the real-time temperature data is equal to a low-temperature threshold T0, setting a dynamic threshold T3 to a sum of the low-temperature threshold T0 and a threshold adjustment step value d, in response to determining that the real-time temperature data is equal to the dynamic threshold T3, assigning a first high-temperature threshold T1 to the dynamic threshold T3, in response to determining that the real-time temperature data is equal to the dynamic threshold T3, determining whether the dynamic threshold is equal to a second high-temperature threshold T2, if yes, assigning the second high-temperature threshold T2 to the dynamic threshold T3, and if no, assigning a sum of the dynamic threshold T3 and the threshold adjustment step value d to the dynamic threshold T3, wherein T2 is greater than T1, and T1 is greater than T0.

2. The temperature feedback control system according to claim 1, wherein the temperature feedback control system further comprises a timer, which connects to the microprocessor and is configured to output an interrupting signal at a preset interval to trigger entering of an interrupting processing routine by the microprocessor.

3. The temperature feedback control system according to claim 1, wherein the temperature data acquiring module comprises:

a temperature sensor unit, configured to detect a temperature of the chip and generate a corresponding temperature analog signal;

a data processing unit, configured to trigger, according to an enabling signal sent by the microprocessor, working of the temperature sensor unit, to convert the temperature analog signal to a temperature digital signal; and a storage unit, configured to store the temperature digital signal as real-time temperature data.

4. The temperature feedback control system according to claim 1, wherein the microprocessor comprises:

an enabling signal generating unit, configured to generate the enabling signal according to a temperature acquiring start instruction in the control data packet;

a data reading unit, configured to read the real-time temperature data from the temperature data acquiring module;

a data operation and processing unit, configured to execute the temperature feedback algorithm to generate and output the corresponding performance control parameter; and an interrupting triggering unit, configured to trigger, according to the interrupting signal sent by the timer, working of the data reading unit and the data operation and processing unit.

5. A temperature feedback control method that is based on a temperature feedback control system for DVFS (Dynamic Voltage Frequency Scaling), wherein the temperature feedback control method comprises:

generating and sending, by a main processor included in the temperature feedback control system for DVFS, a control data packet according to a temperature feedback trigger signal;

triggering, by a microprocessor included in the temperature feedback control system for DVFS, according to the control data packet, acquiring of real-time temperature data of a chip by a temperature data acquiring module included in the temperature feedback control system for DVFS;

reading, by the microprocessor, the real-time temperature data of the chip from the temperature data acquiring module, and executing, by the microprocessor, a temperature feedback algorithm on the real-time temperature data according to the control data packet to output a corresponding performance control parameter to a DVFS circuit included in the temperature feedback control system for DVFS; and adjusting, by the DVFS circuit, a working frequency and a working voltage of the chip according to the performance control parameter;

wherein the microprocessor continues to read the real-time temperature data and execute the temperature feedback algorithm when the microprocessor does not receive a process termination instruction sent by the main processor, wherein executing the temperature feedback algorithm comprises:

in response to determining that the real-time temperature data is equal to a low-temperature threshold T0, generating and outputting, by a data operation and processing unit, a corresponding performance control parameter to the DVFS circuit, and setting a dynamic threshold T3 to a sum of the low-temperature threshold T0 and a threshold adjustment step value d, in response to determining that the real-time temperature data is equal to the dynamic threshold T3, generating and outputting, by the data operation and processing unit, a corresponding performance control parameter to the DVFS circuit, and assigning a first high-temperature threshold T1 to the dynamic threshold T3, and in response to determining that the real-time temperature data is equal to the dynamic threshold T3, generating and outputting, by the data operation and processing unit, a corresponding performance control parameter to the DVFS circuit, determining whether the dynamic threshold is equal to a second high-temperature threshold T2, if yes, assigning the second high-temperature threshold T2 to the dynamic threshold T3, and if no, assigning a sum of the dynamic threshold T3 and the threshold adjustment step value d to the dynamic threshold T3 wherein T2 is greater than T1, and T1 is greater than T0.

6. The temperature feedback control method according to claim 5, wherein the triggering acquiring of real-time temperature data comprises:

generating, by an enabling signal generating unit in the microprocessor, an enabling signal according to a temperature acquiring start instruction in the control data packet;

triggering, by a data processing unit in the temperature data acquiring module, according to the enabling signal, working of a temperature sensor unit;

detecting, by the temperature sensor unit, a real-time temperature of the chip and generating a corresponding temperature analog signal; and converting, by the data processing unit, the temperature analog signal to a temperature digital signal, and storing the temperature digital signal as real-time temperature data in a storage unit.

* * * * *